(12) United States Patent
Rohrl et al.

(10) Patent No.: US 11,176,076 B2
(45) Date of Patent: Nov. 16, 2021

(54) VALUE DOCUMENT HANDLING APPARATUS HAVING A DATA COMMUNICATION SYSTEM AND METHOD FOR DISTRIBUTING SENSOR DATA IN A VALUE DOCUMENT HANDLING APPARATUS

(71) Applicant: Giesecke+Devrient Currency Technology GmbH, Munich (DE)

(72) Inventors: Wolfgang Rohrl, Riemerling (DE); Holger Trumpfheller, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 16/868,806

(22) Filed: May 7, 2020

(65) Prior Publication Data

US 2020/0264999 A1 Aug. 20, 2020

Related U.S. Application Data

(63) Continuation of application No. 15/569,953, filed as application No. PCT/EP2016/000689 on Apr. 28, 2016, now abandoned.

(30) Foreign Application Priority Data

Apr. 28, 2015 (DE) .................... 10 2015 005 450.3
Mar. 9, 2016 (DE) .................... 10 2016 002 897.1

(51) Int. Cl.
*G06F 13/40* (2006.01)
*G07D 7/004* (2016.01)
(Continued)

(52) U.S. Cl.
CPC ...... *G06F 13/4027* (2013.01); *G06F 13/4022* (2013.01); *G06F 13/4282* (2013.01); *G07D 7/00* (2013.01); *G07D 7/004* (2013.01)

(58) Field of Classification Search
None
See application file for complete search history.

(56) References Cited

U.S. PATENT DOCUMENTS 5,923,413 A 7/1999 Laskowski
6,041,330 A * 3/2000 Carman .................. G06F 8/78
(Continued)

FOREIGN PATENT DOCUMENTS

DE 102012024397 A1 6/2014
DE 102012025084 A1 6/2014
(Continued)

OTHER PUBLICATIONS

International Search Report from PCT Application No. PCT/EP2016/000689, dated Jun. 13, 2016.
(Continued)

*Primary Examiner* — Henry Tsai
*Assistant Examiner* — Christopher A Bartels
(74) *Attorney, Agent, or Firm* — Workman Nydegger

(57) ABSTRACT

Methods involve distributing a data stream in a value-document processing apparatus from at least one sensor to at least one processing unit and a system for distributing sensor data. The value-document processing apparatus has a distributing device and at least one processing unit. The distributing device comprises at least two data interfaces. A sensor data packet is created and comprises the sensor data and a target address. The target address describes a physical memory address of the at least one processing unit. The sensor data packet is sent to one of the data interfaces of the distributing device. The distributing device receives the
(Continued)

sensor data packet at a further data interface. The sensor data packet is relayed by the distributing device to the at least one processing unit.

20 Claims, 7 Drawing Sheets

(51) Int. Cl.
*G07D 7/00* (2016.01)
*G06F 13/42* (2006.01)

(56) References Cited

U.S. PATENT DOCUMENTS

| | | | |
|---|---|---|---|
| 6,363,164 B1* | 3/2002 | Jones | G06K 9/033 |
| | | | 382/135 |
| 8,061,913 B2* | 11/2011 | Meyerhofer | B41J 2/32 |
| | | | 400/521 |
| 9,141,876 B1 | 9/2015 | Jones et al. | |
| 9,846,670 B2 | 12/2017 | Rohr et al. | |
| 10,203,967 B1* | 2/2019 | Atta | G06F 13/4282 |
| 2002/0173874 A1 | 11/2002 | Lax | |
| 2005/0243379 A1 | 11/2005 | Klein et al. | |
| 2009/0174142 A1 | 7/2009 | Sullivan | |
| 2009/0184257 A1* | 7/2009 | Shakespeare | G01J 3/36 |
| | | | 250/459.1 |
| 2009/0327016 A1 | 12/2009 | Ford et al. | |
| 2010/0052307 A1* | 3/2010 | Schutzmann | B42D 25/29 |
| | | | 283/67 |
| 2011/0087895 A1 | 4/2011 | Olson et al. | |
| 2013/0023319 A1* | 1/2013 | Snow | G07F 17/3276 |
| | | | 463/13 |
| 2014/0001104 A1* | 1/2014 | Petermann | G07D 11/25 |
| | | | 209/534 |
| 2014/0166745 A1 | 6/2014 | Graef et al. | |
| 2015/0098642 A1* | 4/2015 | Jacomet | G07D 7/004 |
| | | | 382/135 |
| 2015/0243122 A1* | 8/2015 | Saffari | G07F 17/3244 |
| | | | 463/17 |
| 2015/0317268 A1 | 11/2015 | Rohr et al. | |
| 2016/0041934 A1 | 2/2016 | Petrov | |
| 2016/0078724 A1 | 3/2016 | Saffari et al. | |
| 2016/0179738 A1 | 6/2016 | Guddeti et al. | |
| 2016/0189465 A1 | 6/2016 | Neuhauser et al. | |
| 2016/0234038 A1 | 8/2016 | Mounier et al. | |
| 2017/0309106 A1* | 10/2017 | Frankenberger | G07D 7/181 |

FOREIGN PATENT DOCUMENTS

EP 2482256 A1 8/2012
WO 2014090405 A1 6/2014

OTHER PUBLICATIONS

Indian Examination Report corresponding Application No. 201737036550, dated Jul. 20, 2020.

* cited by examiner

VALUE DOCUMENT HANDLING APPARATUS HAVING A DATA COMMUNICATION SYSTEM AND METHOD FOR DISTRIBUTING SENSOR DATA IN A VALUE DOCUMENT HANDLING APPARATUS

BACKGROUND

The invention relates to a system for distributing sensor data in a value-document processing apparatus as well as a method for distributing sensor data in a value-document processing apparatus.

Value-document processing apparatuses are known in particular for processing bank notes. For this, value documents are classified with regard to the currency, the value, the authenticity, the quality and/or the orientation. The orientation of a value document, assuming a rectangular value document, will hereinafter be understood to be one of the four possible positions that can be obtained by rotating the value document around its longitudinal and transverse axes by 180° in each case. The quality of a value document is understood to be in particular its state; in the case of bank notes the state can be given for example by an association with classes such as "fit for circulation" and/or "unfit for circulation" and/or "damaged" or "damaged" in connection with the kind of damage. In dependence on the classification, the value documents can then for example be sorted and, where applicable, deposited in corresponding output regions. This will be explained by the example of value documents in the form of bank notes.

The classification is effected on the basis of different physical properties of the individual, i.e. respectively processed, bank note. Examples of such physical properties are optical properties, for example color properties, magnetic properties or ultrasonic properties.

Within the scope of the present patent application, value documents are understood to be sheet-shaped objects which represent, for example, a monetary value and hence should not be manufacturable arbitrarily by unauthorized persons. They hence have features that are not simple to manufacture, in particular to copy, whose presence is an indication of authenticity, i.e. manufacture by an authorized body. Important examples of such value documents are coupons, checks and in particular bank notes.

Upon capturing the different physical properties of the individual, i.e. respectively yet to be processed or already processed, bank note, sensor data which are employed for the classification are generated by means of sensors upon the processing of bank notes in bank-note processing apparatuses. The sensor data comprise measurement values established by the sensors, in particular a physical property of at least of one portion of the bank note. The sensor data can already be subjected to a processing operation in the sensor, for example corrections with respect to calibration and/or removal of noise or background components. The sensor data created by the sensor can be outputted as an analog or digital signal.

The sensor data delivered by the sensors are usually evaluated in an evaluation device connected to the sensor which can also be designed at least partly for controlling the value-document processing apparatus. Upon the evaluation, bank-note features characterizing banknote type, authenticity and quality of the bank note are determined by suitable evaluation methods. In dependence on the determined bank-note features there is then computed by the evaluation device a classification result, which subsequently determines which output pocket of the bank-note processing apparatus the bank note is to be deposited in. Preferably, the evaluation device drives a transport device of the bank-note processing apparatus in dependence on the classification result.

The evaluation methods and the establishment of the classification result has to be adapted to the type of bank notes to be processed and also to the requirements of the operators of bank-note processing apparatuses. For this purpose, the evaluation device, preferably at least an evaluation program running therein, is parameterizable, i.e. there are classification parameters present whose values can be stipulated and which are employed upon evaluation and classification or establishment of the classification result; said adapting of the classification parameter values, often also designated as adapting the classification parameters, will hereinafter be designated as adaptation.

Upon checking bank notes, different features of a large number of bank notes are checked. Many of these features effectuate a large data volume. Furthermore, the sensor data captured upon checking are sent to one or a plurality of processing units or evaluation apparatuses for different evaluation. A high data transfer therefore takes place between the sensors and the processing units.

For the checking of bank notes, sensors are used which increasingly have a higher resolution. This leads increasingly to a large amount of data which has to be transferred from the sensor to a processing unit. Further, the demands as to the processing speed increase so that the number of bank notes to be checked and/or sorted per second rises. In addition, the trend of a rising number and complexity of security features continues, which leads to more and more elaborate algorithms for checking bank notes.

SUMMARY

It is therefore an object of the invention to supply a method for distributing a data stream in a value-document processing apparatus, thereby remedying the disadvantages of the prior art. In particular, it is an object of the invention to provide a method and an apparatus for relaying a data stream, thereby enabling a high throughput of value documents to be checked and therefore a high data throughput.

A method according to the invention relates to a distributing of a data stream in a value-document processing apparatus from at least one sensor to at least one processing unit. The value-document processing apparatus comprises a distributing unit and at least one processing unit. The distributing device has at least two data interfaces. The method comprises the steps of:

Creating a sensor data packet. The sensor data packet comprises sensor data and a target address. The target address describes a physical memory address of one of the processing units.

Sending the sensor data packet to one of the data interfaces of the distributing device.

Receiving the sensor data packet at one of the data interfaces of the distributing device.

Relaying the sensor data packet by the distributing device to the at least one processing unit. For this purpose, the distributing device establishes relaying parameters from the target address of the sensor data packet. In dependence on the relaying parameters and the target address, the distributing device determines a further data interface for outputting the sensor data packet to one of at least one processing units to which the sensor data packet is designated. The further data interface is allocated to the one processing unit.

Receiving the sensor data packet by respective processing unit.

Depositing the sensor data packet and therefore the sensor data in the physical memory address, described by the target address, of the at least one processing unit.

The data stream can comprise sensor data, a sensor data packet or other information items. Within the framework of the invention, for the sake of simplicity, as a rule merely the term sensor data packet is employed.

In one execution form it can be provided that the sensor data packets are transported according to the PCIe standard or the Rapid-IO standard.

A system according to the invention for distributing sensor data in a value-document processing apparatus comprises at least one distributing unit and at least one processing unit. The at least one distributing unit has at least two data interfaces, wherein one is designed for receiving a sensor data packet and the one further data interface is connected to one of the at least one processing units. The processing unit has a computing unit and a memory. The memory has a physical memory address.

The distributing unit is designed to receive the sensor data packet and to establish relaying parameters from the sensor data packet in dependence on a target address contained in the sensor data packet. The target address describes a physical memory address of the processing unit. The processing unit is connected to the further data interface which is assigned by the relaying parameters of the target address of the sensor data packet at which the sensor data packet is outputted. The distributing device sends the sensor data packet via the respective data interface to the respective processing unit.

With the present invention it is possible to send sensor data by a sensor data packet to one of the at least one processing units and to write directly to the memory of the at least one processing unit without requiring elaborate copy operations and/or address conversions with the help of a computing unit and/or computing power by the computing unit. Furthermore, the sensor data of one or several processing units can be supplied simultaneously, without a sensor having to supply a multiple of the sensor data via a communication connection.

Due to the target address, the data interface of the distributing device is determined for outputting or relaying the sensor data packet. A flexible adapting of the distribution of the sensor data or the data stream in the value-document processing apparatus is possible by specifying the target address and/or relaying parameters. In particular, different sensors as well as the utilization of a processing unit can be taken into consideration so that a high degree of utilization of all components of the system (the optionally present at least one coupling unit, the at least one processing unit and the distributing device) can be achieved.

The method according to the invention can be applied to previous systems of value-document processing apparatuses insofar as the previous sensors can be further employed with the new method.

Within the framework of the invention, a processing unit is understood as an apparatus which is suitable for processing sensor data. The processing of sensor data can comprise an evaluating or partial evaluating of the sensor data, a comparison with at least one reference value and or the transforming or converting as well as filtering of values from the sensor data. The processing unit preferably has a computing unit, for example a processor or CPU, and a memory which the computing unit can access and to which the sensor data are written.

The system can comprise at least one coupling unit. In an advantageous embodiment, the sensor data packet is created by a coupling unit. Here, the coupling unit receives the sensor data, for example directly from a sensor via a suitable sensor interface. As an particularly suitable sensor interface there should be mentioned interfaces according to the Camera link (CL) standard, the High-Level Data Link Control (HDLC) standard and/or the Common Detector Interface (CDI) specification. Preferably, the sensor data are formatted by the coupling unit according to a stipulated protocol which is employed for transmitting the sensor data packet to the processing unit so that the sensor data packet is present in a suitable format. Moreover, the coupling unit determines the target address for the sensor data packet. The target address is preferably available to the coupling unit. In one embodiment, the target address can be firmly stipulated to the coupling unit. In an alternative embodiment, the target address can be firmly stipulated by a control unit at the beginning or start of the system and variably during the operation of the value-document processing apparatus, e.g. individually for each bank note. In an alternative embodiment, the coupling unit can determine the target address by a selection and/or algorithm, for example with regard to the quantity of the sensor data, their quality and/or the type of the corresponding sensor, for example magnetic sensor, image sensor and/or ultrasonic sensor. The coupling unit therefore serves as a communication link between for example sensor and distributing device.

The coupling unit is preferably designed with a computing unit, for example a processor and/or an FPGA (Field Programmable Gate Array). The coupling unit is preferably responsible for creating the sensor data packet. For this purpose, the coupling unit preferably executes a sensor-specific transformation of the sensor data, for example a so-called flat-field correction and/or performs an adapting of the transmission protocol. For example, sensors can be exchanged or replaced during an adaptation of the value-document processing apparatus, the servicing and/or repair thereof. Preferably, the coupling unit has a PCIe interface via which the coupling unit is in communication with the distributing device and the sensor data packet is sent to the distributing device. Here, the communication connection between the at least one coupling unit and the distributing device is designed as a PCIe connection, for example in 4-lane execution.

The at least one coupling unit can, in one embodiment, be supplied as a computer card (board) or integrated in a sensor. Preferably, the at least one coupling unit has two interfaces, wherein one interface is designed for connecting to the sensor and the second interface for connecting to the distributing device. In a particular embodiment, the coupling unit has a third interface to a further sensor. The coupling unit can be designed to mix the sensor data of the at least two sensors and to send these to at least one processing unit via the distributing device while employing a target address. Alternatively, the coupling unit can be designed to send the sensor data of each of the at least two sensors respectively as sensor data packet to at least one processing unit via the distributing device while employing a target address.

In one embodiment, one of the at least one coupling units can create at least two sensor data packets from the received sensor data. For example, the sensor data packets can be divided corresponding to a maximum memory size for sending and/or receiving, in particular storing, by the at least one processing unit determined by the target address.

The control unit comprises preferably a computing unit, for example a processor, and particularly preferably a memory. The control unit is preferably designed to evaluate the processing results obtained from the at least on processing unit and to output these as evaluation results to a machine control. The evaluation result can be employed for driving a sorting device. The transmission of the evaluation result is preferably effected by means of a machine interface, for example via a CAN-Bus and/or Ethernet. Preferably, the control unit is supplied in combination with at least one processing unit. Here, in particular the at least one processing unit can adopt the function of the control unit. In a preferred embodiment, the control unit comprises a root complex, in particular for a data communication network between the optionally present at least one coupling unit, the at least one processing unit and the distributing device.

In a preferred embodiment, a relaying table is deposited in the distributing device. The relaying table has relaying parameters for target addresses as well as information items for selecting a suitable data interface for outputting the sensor data packet. The relaying table can, for example, be stored in the distributing device. Alternatively, the relaying table can be present in a memory external to the distributing device, for example on a memory card and/or on a server. The relaying table can be present in classic tabular form. Further, instead of the relaying table, an algorithm can be present for determining the data interface from a target address while employing relaying parameters.

In one embodiment, the system can comprise at least two processing units. For this purpose, it is provided that the distributing device passes on the received sensor data packet to at least two data interfaces (multiple-distribution functionality). Here, the distributing device preferably copies the sensor data packet correspondingly. Here, the target address of the sensor data packet preferably corresponds to a physical memory address which all processing units have which should receive the sensor data packet. I.e., all processing units which should receive the sensor data packet expect the sensor data at the same physical memory address.

Corresponding to the components of the system, a (target) address space is set in the distributing device. I.e., the target-address space preferably mirrors the physical memory addresses of the components connected to the distributing device of the system. In one execution form, to each target address is allocated at least one data interface of the distributing device.

On account of the multiple-distribution functionality, a high degree of parallelization is possible for processing sensor data. A processing of compute-intensive sensor data and/or upon processing identical sensor data for different purposes in particular is improved by this functionality. Furthermore, the distribution of sensor data is unburdened because not all processing units receive all sensor data and have to filter required sensor data, and a multiple sending by the sensor is also avoided.

In an advantageous embodiment, a processing unit is designed for sending processing results (or partial results) to the distributing device. The processing results are preferably sent like the sensor data packet as a processing result package. The target address of the processing result package can relate to, for example, a further processing unit and/or the control unit. Analogously to the sensor data packet, the distributing device establishes from the target address a data interface for relaying.

In one embodiment, the control unit is designed to configure the sensor, one of the at least one coupling units, the distributing device and/or one of the at least one processing units (components of the system). In particular, the control unit configures the components of the system upon a system start and gives settings, such as initially a target address, to the least one coupling unit for sending the sensor data packet. Particularly preferably, the control unit of the distributing device supplies the relaying parameters and/or the relaying table, as far as present.

In a preferred embodiment, the control unit configures the target addressing range for sending data, in particular sensor data, from the coupling unit and/or the processing unit. The configuration can be carried out upon the system start as well as dynamically so that during the operation the control unit stipulates the target addresses to which data packets are sent.

Preferably, the control unit has an interface to sensors, in particular a CDI interface, an interface to a CAN-Bus and/or an interface to a clock generator. For example, the clock generator can display a value-document announcement or a value-document number with regard to an order and/or supply a time information item, for example a timing. Further, the control unit can be designed to carry out an evaluation of results of at least one processing unit and to send, where applicable, signals for controlling parts of the value-document processing apparatus, for example for controlling a sorting device of the value-document processing apparatus.

In a preferred embodiment, sensor data of a value document are delivered according to an order, in particular to every N-th value document, to the coupling unit and/or the processing unit for sending a data packet to a certain target address (interleaved evaluation).

Upon an interleaved processing having an interleaving factor V, processing units are divided into V equally large groups; the first group of the processing units obtains the data of the value documents N, N+V, N+2*V . . . . The second group obtains the data of the value documents N+1, N+V+1, N+2*V+1 . . . . The last group obtains the data of the value documents N+V−1, N+2*V−1, N+3*V−1 . . . . The interleaved processing is based on the fact that the processing of a value document can be effected fully independently of the evaluation of other value documents. Hence this method also requires no particular communication between the groups.

The interleaved processing of data has the advantage that one obtains a parallelization in a simple manner without having to parallelize the evaluation algorithms for each bank note explicitly, and it yields an additional efficiency gain when less sensor data are loaded into the processing units because the interface to the memory can thereby be relieved distinctly.

In an advantageous embodiment, the system has a control unit as explained above. The control unit serves in particular for configuring the components of the system, particularly preferably for setting target addresses for sending data packets The control unit can be supplied as a separate unit or component in the system. Alternatively, the control unit can be a part of the processing unit and/or a further processing unit.

In one execution form, the sensor data packet is designed according to the PCIe standard or Rapid-IO standard. The at least two data interfaces of the distributing device, as well as the interfaces for the communication between the optionally present at least one coupling unit and/or the at least one processing unit, are designed correspondingly as PCIe interfaces or Rapid-IO interfaces. Correspondingly, the distributing device is designed as a PCIe switch or Rapid-IO switch. Correspondingly, the components of the system are connected via a PCIe or Rapid-IO cable.

In principle, the components of the system can be connected via a second communication system, for example by means of Ethernet, for exchanging information items or data. Furthermore, the components of the system can have interfaces to, for example, user interfaces, e.g. for input and output, a memory and/or to clock-based services, e.g. machine cycle.

The at least one coupling unit, at least one processing unit and/or the distributing device are preferably supplied as computer cards. The computer cards can be attached to a rack.

The system is preferably designed such that the components of the system are interconnected and communicate via a point-to-point connection. In particular, each of the optionally present at least one coupling units are connected preferably via a point-to-point connection to the distributing device and the distributing device via a point-to-point connection to each of the at least one processing units.

In one embodiment, the system can be designed such that the sensor data packet is transported according to the PCIe standard or Rapid-IO standard, for which the distributing device is configured as a PCIe switch or Rapid-IO switch and the coupling device and the processing device have corresponding PCIe or Rapid-IO interfaces.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

For the sake of simplicity and quicker understanding, identical structural parts and structural parts with identical or similar function are marked with the identical reference sign insofar as sensible.

Figure 1:
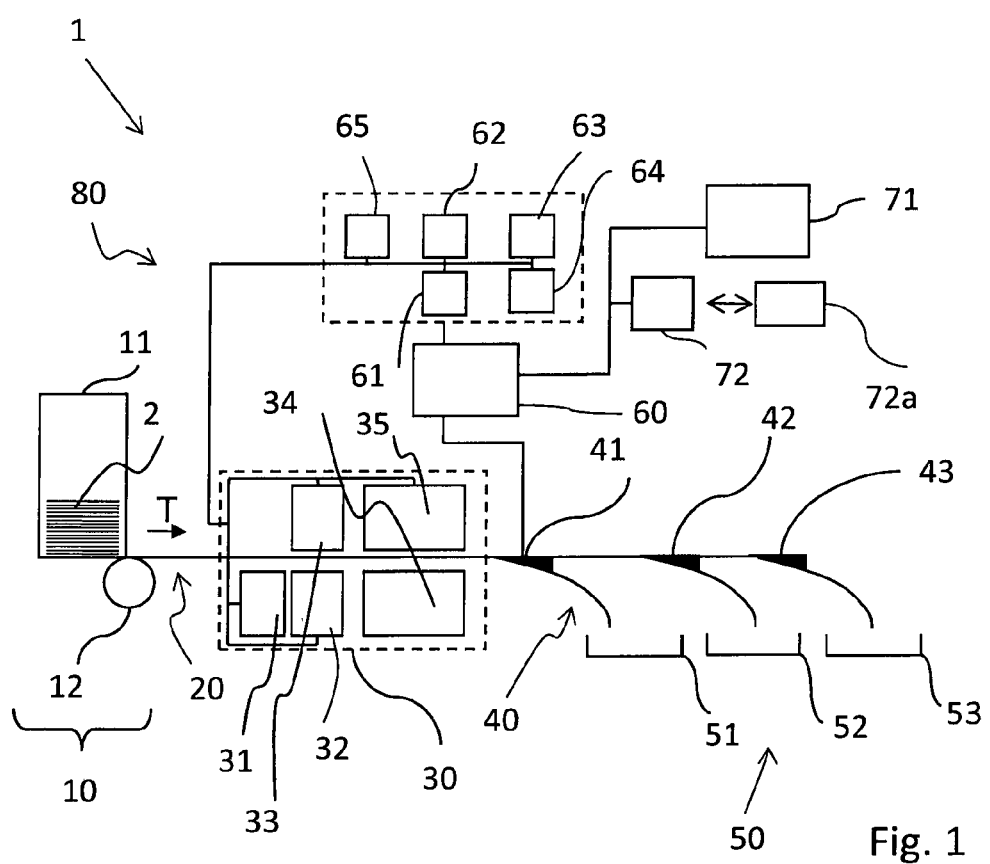
FIG. 1 a schematic view of a value document processing apparatus.

In FIG. 1, a value-document processing apparatus 1 is represented schematically for processing bank notes 2 for example. The value-document processing apparatus 1 is designed for sorting bank notes 2 in dependence on the classification of bank notes 2. For the classification, for example, the authenticity, the state and/or the valency of inputted bank notes 2 are examined. The hereinafter described components of the system of the apparatus are preferably arranged in a not-shown housing of the apparatus or held on said housing, unless they are designated as external. The construction of the described value-document processing apparatus 1 is only exemplary.

The apparatus has a transport device 20 with which the bank notes 2 are transported by a feeding device 10 to an output device 50. The bank notes 2 are moved along a transport path in transport direction T. The feeding device 10 has an input pocket 11 for receiving bank notes 2 to be sorted. A singler 12 singles the bank notes 2 incorporated into the input pocket 11. The singler removes only one bank note 2 at a time from the input pocket 11 so that only one bank note at a time is delivered from the input pocket 11 to the transport device 20.

From the singler 12, the transport device 20 feeds the singled bank notes 2 to a sensor device 30. In this execution example, the sensor device 30 has several sensors 31, 32, 33, 34, 35, in the present case an optical transmission sensor 31, for example in the instance and arrangement as a bright-field transmission sensor and/or dark-field transmission sensor, a magnetic sensor 32, an ultrasonic sensor 33 and two image sensors 34, 35. The optical transmission sensor 31 captures a transmission colored image and a transmission IR image (IR: infrared) of the bank note 2. The image sensors 34, 35 are designed for capturing a remission color image and a remission IR image (IR: infrared) of the bank note 2. The image sensors 34, 35 generate an image-producing rendition of the planar surfaces of the bank note 2, namely its front and the back side. The ultrasonic sensor 33 captures ultrasound transmission properties of the bank note 2 in a spatially resolved manner. In principle, the stated sensors 31 to 35 can, as represented, be used jointly, separately or in a combination thereof in a value-document processing apparatus 1.

The measuring data (sensor data) captured by the sensors 31, 32, 33, 34, 35 correspond substantially to measuring data or raw data. In particular cases, the sensor can supply revised measuring data, for example taking into account calibrating data and/or noise properties.

The sensors 31, 32, 33, 34, 35 are respectively connected to five processing units 61, 62, 63, 64, 65 via a coupling unit (not represented) or a data communication network 80. The processing units 61, 62, 63, 64, 65 process the measuring data captured by the sensors 31, 32, 33, 34, 35 and give the processed measuring data to a machine control apparatus 60. In the present case, the machine control apparatus 60 is designed as a computing unit and comprises a processor and a memory. The processed measuring data of the processing units 61, 62, 63, 64, 65 are delivered to the computing unit and are deposited for further processing. Further, the memory can be designed as a memory external to the machine control apparatus 60 for the processed measuring data, for example in a server.

In the present case, the machine control apparatus 60 is connected by a user interface 72 for interaction with a user. The user interface 72 can be a display device 72a and/or a keyboard, preferably a touch panel (combination of display and control panel), or be connected thereto. Further, the machine control apparatus 60 is connected to an external data processing equipment 71, for example a server.

The value-document processing apparatus 1 in the present case is designed for being operated in two operating modes, a sorting mode for sorting value documents 2 in dependence on their condition or quality and their authenticity, and a measuring-data capture mode for capturing measuring data for stipulated value documents 2. In particular, the sensors 31-35 are correspondingly designed for this purpose. The processing units 61-65 for example evaluate measurement values or sensor data received from the sensors 31, 32, 33, 34, 35. For example, the currency, nomination (valency), level of fitness (state) and/or likely authenticity of the singled bank note 2 are determined by the evaluation. Instead of the stated two operating modes just one operating mode would be conceivable.

In the sorting mode, value documents 2 are singled by the feeding device 10 and are transported past the sensor device 30 or therethrough. The sensor device 30 captures or measures physical properties of the value document 2 respectively transported past or through it and forms sensor data which describe the measurement values for the physical properties of the corresponding value document 2. In dependence on the evaluated measurement values for a value document 2 and the classification parameters stored in the evaluation device 60, the evaluation device 60 classifies the value document 2 into one of the stipulated authenticity classes. Preferably, the evaluation device 60 controls the transport device 20 by emitting actuating signals, here more precisely a sorting device 40, in such a way that the value document 2 is outputted according to its class, established upon the classification, in one of the output pockets 51, 52, 53 of the output device 50 allocated to the class. The association with one of the stipulated authenticity classes or the classification is effected here in dependence on at least one stipulated authenticity criterion and/or nomination criterion.

In the measuring-data capture operating mode, value documents 2 are singled from the feeding device 10 and fed to the sensor device 30 or transported therethrough. The sensor device 30 captures or measures physical properties of the respective value document 2 fed to it or transported therethrough. The sensor device 30 forms sensor data which describe or comprise measurement values for the physical properties. The evaluation device 60 captures the sensor data and stores corresponding sensor data at least temporarily, in particular measuring data as well as information items for analyzing the sensor data. After the capturing, the value documents are stacked in the output device 50, for example in the first output pocket 51.

The sorting of the bank note 2 to an output pocket 51, 52, 53 is effected in the present case by the evaluation device 60. According to the evaluation result of the sensor data, the evaluation device 60 addresses a first branching 41, a second branching 42 or a third branching 43 of the sorting device 40. The branchings 41, 42, 43 are arranged in transport direction T after the sensor device 30 in the transport device 20 and are designed such that they engage in the transport path and feed the singled bank note 2 to the first or second or third output pocket 51, 52, 53.

Instead of the different operating modes described above, one execution form of a banknote processing apparatus can also have merely a selection of operating modes. Further, it can be provided that there is no unambiguous separation of the operating modes but rather a merged operating mode, for example a combination of sorting mode and measuring-data capture mode.

Hereinafter, particular aspects of the data processing, in particular in the distribution of sensor data, in the value-document processing apparatus are described.

Figure 2:
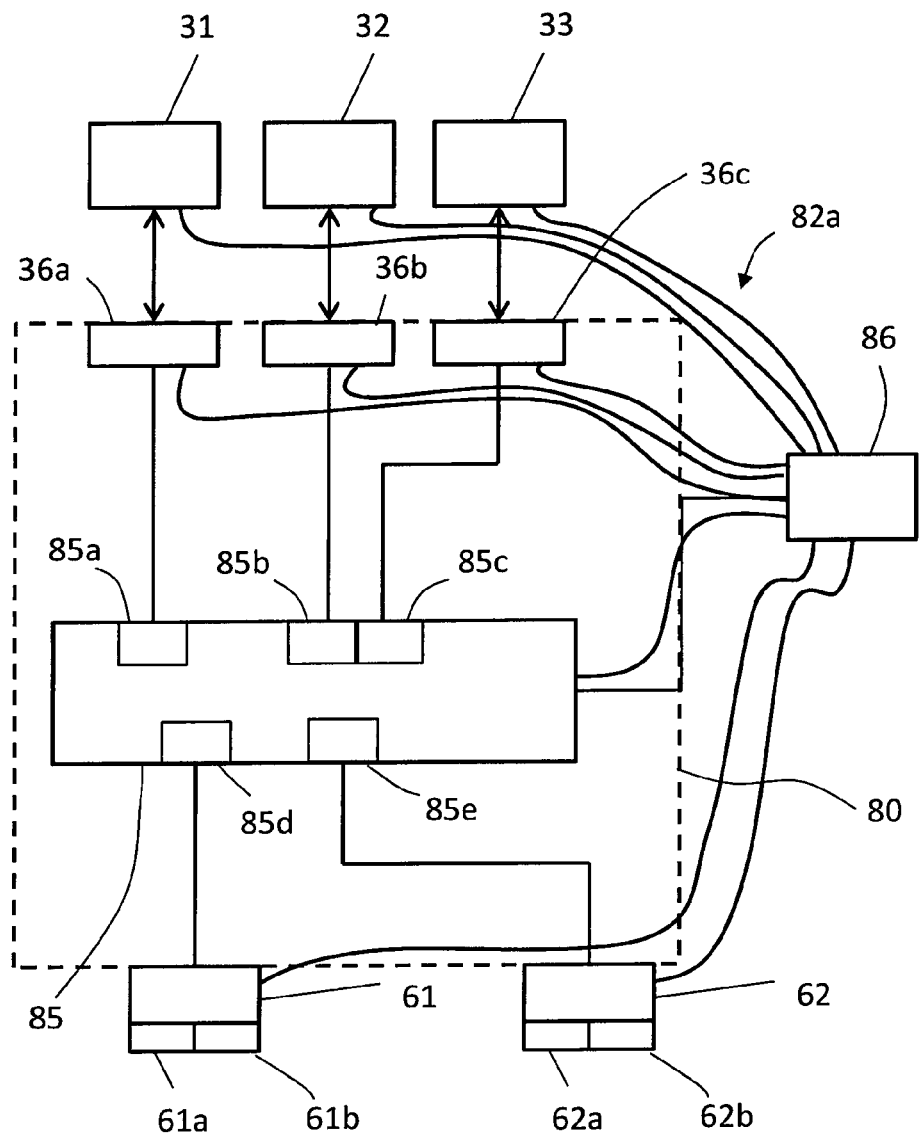
FIG. 2 a schematic view of an execution example of a system for distributing data packets according to the invention.

In FIG. 2, an execution example of a system for distributing sensor data is schematically represented by functional assemblies or functional components.

In this execution example, the system comprises three sensors 31, 32, 33, three coupling units 36a, 36b, 36c, a distribution unit 85 as well as two processing units 61, 62. The three sensors 31, 32, 33 are respectively connected to the distributing unit 85 by the coupling units 36a, 36b, 36c. Sensor data of the sensors 31, 32, 33 are sent to the coupling units 36a, 36b, 36c. The coupling units 36a, 36b, 36c form sensor data packets from the sensor data and send these to the distributing device 85. The distributing device relays the sensor data packets according to its determination, namely from a target address entered in the sensor data packets, to the corresponding processing unit for processing the sensor data.

Hereinafter the execution example of the FIG. 2 is explained in detail. For creating sensor data, measurement values are for example captured respectively by an optical transmission sensor 31, magnetic sensor 32 and ultrasonic sensor 33. These measurement values of the sensors 31, 32, 33 are respectively sent via a communication connection to the coupling unit 36a, 36b, 36c. The sensors 31, 32, 33 are connected to one of the coupling units 36a, 36b, 36c via a physical connection, for example via an interface according to the Camera Link (CL) standard, the High-Level Data Link Control (HDLC) standard and/or the Common Detector Interface (CDI) specification.

The coupling units 36a, 36b, 36c create sensor data packets from the sensor data which comprise measurement values. Preferably, the corresponding coupling unit 36a, 36b, 36c determines a target address for the sensor data packets. The target address describes a physical memory address in a memory of the processing unit 61, 62 which is determined for processing the sensor data. Further, the sensor data packets correspond to a stipulated transfer protocol, PCIe in the execution example.

Each of the coupling units 36a, 36b, 36c is connected with a data interface 85a, 85b, 85c of the distributing device 85 via a data connection of a data communication network 80 and sends its sensor data packets to the distributing device 85. The distributing device 85 receives the sensor data packets of the coupling unit 36a at a data interface 85a, the sensor data packets of the coupling unit 36b at a data interface 85b, and the sensor data packets of the coupling unit 36c at a data interface 85c. The data exchange is effected according to PCIe standard.

Relaying parameters are stored in the distributing device 85. The relaying parameters specify an allocation which target address of a sensor data packet is allocated to which data interface 85a, 85b, 85c, 85d, 85e and therefore the processing device 61, 62 and/or coupling unit 36a, 36b, 36c attached thereto. In the present execution example, the coupling unit 36a assigns a target address aaa to the corresponding sensor data packet. In the distributing device 85 there is stored that the data interface 85d is allocated to the target address aaa. The distributing device 85 therefore relays the sensor data packet of the coupling unit 36a having the target address aaa to the data interface 85d. Further, the coupling unit 36b allocates a target address bbb to the corresponding sensor data packet. The distributing device 85 receives the sensor data packet of the coupling unit 36b at the data interface 85b. The distributing device 85 reads the target address of the sensor data packet received at the data interface 85b and establishes parameters for relaying the sensor data packet to one of the data interfaces 85a, 85b, 85c, 85d, 85e of the distributing device. According to the target address bbb, the distributing device 85 selects the data interface 85e for outputting the corresponding sensor data packet.

The sensor data packet with the target address aaa, which is outputted at the data interface 85d, is therefore sent to the processing unit 61. The sensor data packet with the target address bbb, which is outputted at the data interface 85e, is sent to the processing unit 62. The target addresses of the sensor data packets relate to physical memory addresses of the processing units 61, 62. Therefore, the sensor data packet with the target address aaa is written from the data interface 85d directly to the memory address aaa of the memory 61a of the processing unit 61. The sensor data packet with the target address bbb from the data interface 85e is written directly to the memory address bbb of the memory 62a of the processing unit 62. The processing units 61, 62 have respectively an interface for receiving sensor data packets, in the present case a PCIe interface.

The data communication network 80 is designed as a communication system between coupling unit 36a, 36b, 36c and processing unit 61, 62 and serves for transmitting sensor data packets. The data communication network 80 has several target addresses. The target addresses describe a physical memory address of a region in a memory 61a, 62a of at least one of the processing units 61, 62. It is in principle conceivable that several processing units 61, 62 have an equally named target address, i.e. a defined target address in the local bus system describes a physical memory address of several processing units 61, 62. At least one processor 61b, 62b of the processing units 61, 62 accesses the corresponding physical memory address for processing the sensor data from the sensor data packet.

The coupling unit 36c creates a sensor data packet with the assigned target address ccc from the measurement values of the sensor 33. Both processing units 61, 62 have a memory address ccc in their memories. The fact that both processing units 61, 62, and therefore a device of the data communication network 80 has a memory address ccc, wherein the processing units 61, 62 are attached at the data interfaces 85d or 85e, is known to the distributing device 85. Upon receiving the sensor data packet having the target address ccc, the distributing device 85 relays these sensor data packets to the data interfaces 85d, 85e so that the sensor data packet is deposited in the memory address ccc of both processing units 61, 62.

A control unit 86 (sometimes also called configuration unit) is provided for configuring the components, in particular the coupling units 36a, 36b, 36c, the distributing device 85 and the processing units 61, 62. Upon a system start of the value-document processing apparatus, the control unit 86 recognizes the components attached to the data communication network 80. Here, where necessary or not yet present, relaying parameters are transmitted to the distributing device 85 in dependence on the target address of a sensor data packet and/or other data packets. After a first configuration, the control unit 86 controls the coupling units 36a, 36b, 36c for distributing sensor data packets. Here, the control unit 86 can dynamically stipulate for each coupling unit 36a, 36b, 36c a certain target address for the next sensor data packet to be sent according to a (certain) bank note. Here, the control unit 86 of the coupling unit 36a, 36b, 36c can directly stipulate a target address or stipulate a correlation between triggered, in particular numbered, clocking and the target address. The control device can be connected to the components of the system via the data communication network 80 and/or via another data communication system.

From FIG. 2 it is evident that every coupling unit 36a, 36b, 36c is connected to the distributing device 85 via a point-to-point connection. Further, each of the processing units 61, 62 is connected to the distributing device 85 via a point-to-point connection.

Figure 3A:
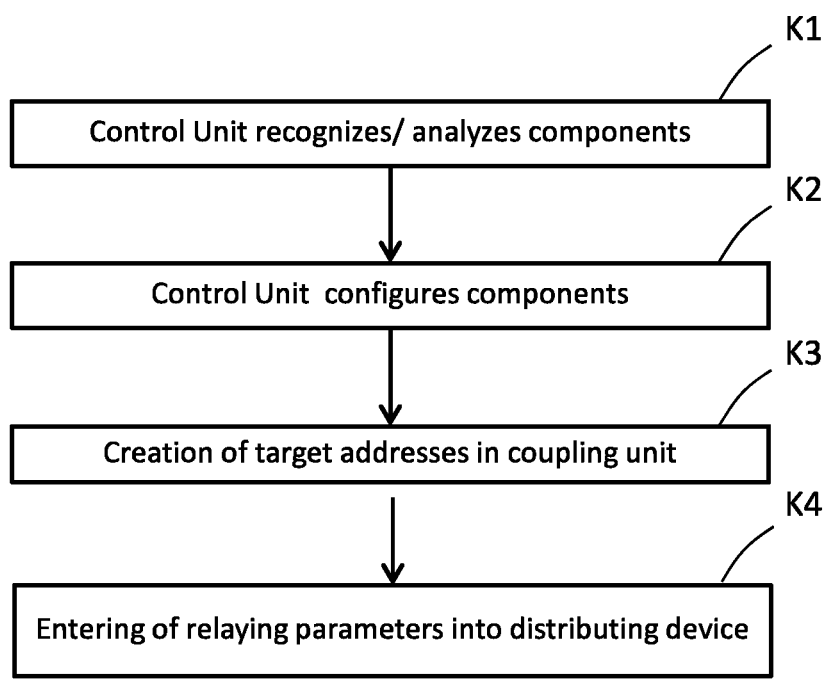
FIG. 3a, b a schematic representation of an execution example for operating a system for distributing data packets.
Figure 3B:
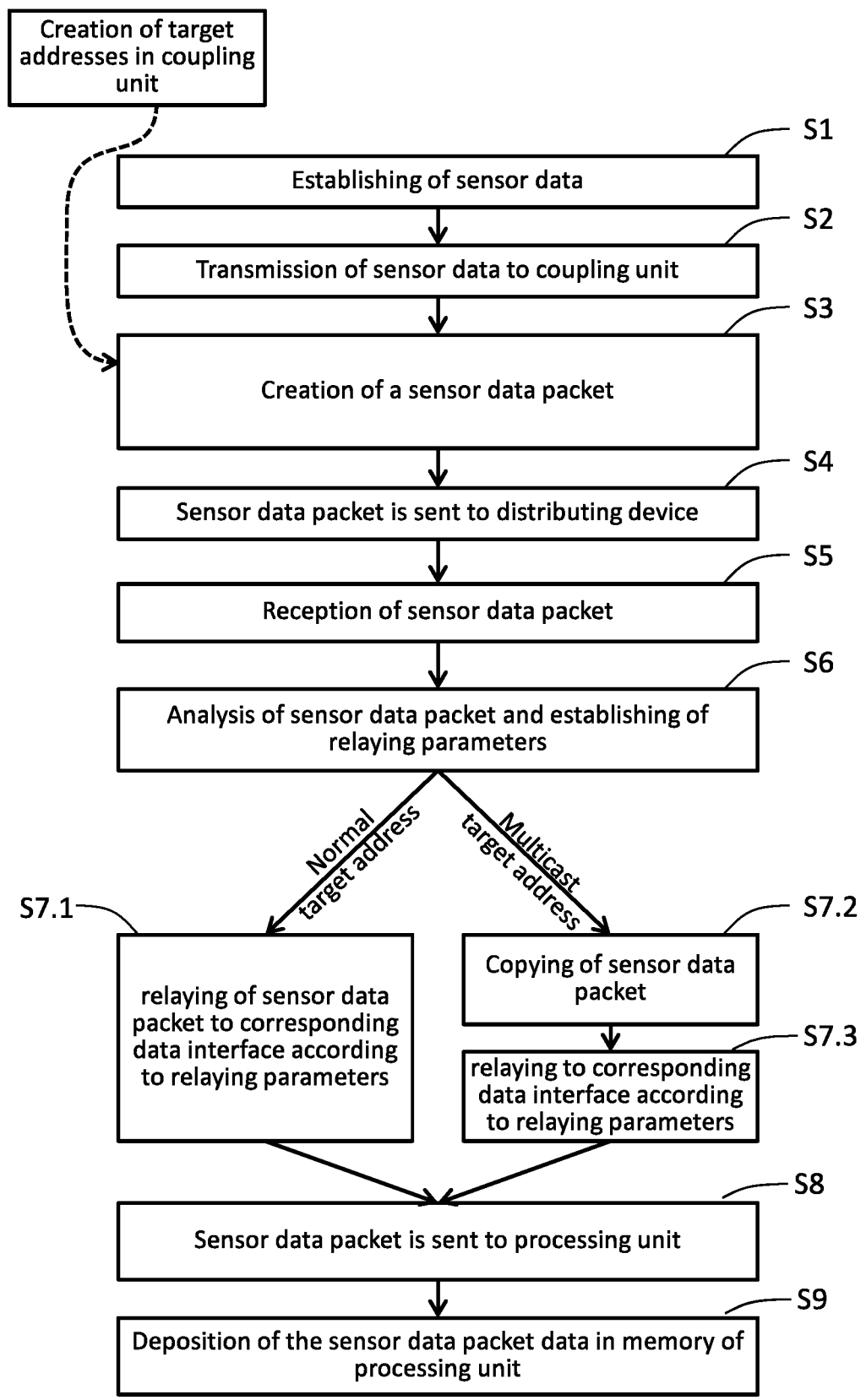

In FIGS. 3a and 3b, a schematic operating sequence of the system according to the invention is represented for distributing sensor data, wherein FIG. 3a shows the course of configuring the system and FIG. 3b the distribution of sensor values at processing units. In a preferred execution form, the configuration is effected via a data communication system independent of the local bus system, for example Ethernet or CAN-Bus.

For configuring the system, the attached devices are queried and established by the control unit in a first step K1. From the components connected to the distributing device, in particular at least one coupling unit, processing unit and, where applicable, sensor, the control unit obtains an information item about their property, type, address, identification and/or purpose of use. Furthermore, preferably an information item about the physical memory, as far as present and accessible, becomes available to the control unit.

The information item on the physical memory, in particular of at least one processing unit, comprises the memory addresses of the memory. The control unit defines the address space for the data communication network 80 from the information items as to the physical memory addresses of the components. Besides target addresses for memory accesses, however, also target addresses for at least one coupling unit 36a, 36b, 36c can be defined in the address space for specifying target addresses. In principle, every memory address relates to only one component of the system. If data is to be distributed to several components simultaneously, these components can have equally defined addresses, at least equally defined target addresses, in the address space of the data communication network 80. In this connection one speaks of the multiple shipping addresses which are specified preferably separately in the definition of the address space.

The control unit creates a starting configuration of the system from the query results, in particular for processing sensor data of the sensors by a processing unit. In particular the control unit creates relaying parameter for the distributing device from the defined address space so that the distributing device can be stipulated with an association from data interface to target address. In step K2, the control unit transmits a corresponding configuration to the distributing device. Further, in step K3, the control unit creates a configuration of the coupling unit and/or the processing unit concerning a target address to be employed for sending data, in particular sensor data packets and/or processing results.

In a step K4, the relaying parameters created by the control unit are entered into the distributing device and activated.

In FIG. 3b, the distribution of sensor data is indicated schematically. In a first step S1, sensor data are established by a sensor. The sensor data are transmitted to the coupling unit in a step S2. The transmission is effected, for example, via a direct signal line. For this purpose, for example the coupling unit has an interface according to the Camera Link (CL) standard, the High-Level Data Link Control (HDLC) standard and/or the Common Detector Interface (CDI) specification. Another interface can, of course, be provided in the coupling unit for receiving and/or attaching a sensor. Alternatively, the coupling unit can be integrated in the sensor.

In a step S3, the coupling unit creates a sensor data packet from the sensor data. The sensor data packet comprises parts of the sensor data as useful data. Further, in step S3, the coupling unit stipulates a target address to the sensor data packet. The target address describes a physical memory address of a processing unit which is determined for processing the sensor data. The sensor data packet is supplied at an interface to the data communication network, in particular a PCIe or Rapid-I/O.

In step S4, the sensor data packet is sent via the interface from the coupling unit to the distributing device. The distributing device receives the sensor data packet (step S5) at the corresponding data interface.

The distributing device analyzes the sensor data packet with regard to the target address (step S6). From the target address, the distributing device establishes one or more data interfaces (steps S7.1-7.3) while employing from relaying parameters.

Via the data interfaces established in steps S7.1-7.3, the corresponding sensor data packet is sent in step S8 to the (target) components, for example the processing unit, which has a memory having the target address. In step S9, the sensor data packet is received by the target component and the contained sensor data are deposited in the target memory address.

In steps S7.1-7.3, the distributing device establishes relaying parameters from the sensor data packet. In particular, the distributing device establishes whether the target address is a multiple-distribution address or "normal" target address, i.e. the target address is present only once as a physical memory address in the bus system. If it is a "normal" target address, the distributing device establishes, for example an allocation table, a data interface of the distributing device which with the component relating to the physical memory to the target address. The distributing device relays the sensor data packet to the corresponding data interface (S7.1)

If the target address is a multiple-distribution address, the distributing device recognizes this from a corresponding entry as well as from the definition in the address space of the data communication network. Corresponding to the number of the affected components which the multiple-distribution target address jointly have as a physical memory address, the distributing device copies (S7.2) the sensor data packet and delivers the sensor data packets to the data interfaces pursuant to the multiple-distribution target address of the distributing device (S7.3).

In a particular execution form, for example the control unit can influence the target address which is stipulated by the coupling unit to the sensor data packet. In a particularly preferred execution form, groups of processing units are employed. The interleaved processing of the bank-note data represents a simple temporal parallelization. For an interleaved processing having an interleaving factor V, processing units are divided into V equally large groups. A first group of the processing units obtains the sensor data of the bank notes N, N+V, N+2*V . . . ; the second group obtains the sensor data of the bank notes N+1, N+V+1, N+2*V+ . . . and the last group of processing units obtains the sensor data of the bank notes N+V−1, N+2*V−1, N+3*V−1 . . . . Instead of a group of processing units, merely respectively one processing unit can be provided, of course.

The interleaved processing is based on the fact that the evaluation of a bank note can be effected fully independent of the processing of other bank notes. Hence this method also requires no particular communication between the mentioned groups of processing units. The interleaved processing of the sensor data has the advantage that one obtains a parallelization in a simple manner without explicitly parallelizing the evaluation algorithms, and it yields an additional efficiency gain if less bank-note data are loaded into the processing units because the burden on the main memory interface can thereby be reduced distinctly.

In particular, the control unit of the respective coupling unit can stipulate a target address according to an order of bank notes or a certain clocking, thereby making an interleaved processing of the sensor data by the processing units possible.

In one embodiment, the multiple-distribution functionality could be employed for the interleaved processing. In particular, it would be conceivable to output a plurality, preferably all, sensor data packets incoming at the distributing device to a plurality, preferably to all, data interfaces which are connected to processing units. The processing units therefore obtain far more sensor data than required and have to ignore or filter out non-required sensor data.

With the represented method it is now possible to deposit sensor data directly in the memory of a processing unit, without requiring extensive address conversions. Furthermore, a high degree of parallelization can be achieved with the help of the represented method. In particular, the sensor data which are utilized by several processing units can be distributed to these processing units simultaneously (multiple-distribution functionality) without burdening the coupling units and their interface to the distributing device as well as the data communication network by a multiple sending of the same data. Therefore, sensor data are also available to several processing units simultaneously. The corresponding processing units obtain the same sensor data and carry out different processing steps. A multiple distribution to processing units therefore leads to a faster processing of the sensor data.

Figure 4:
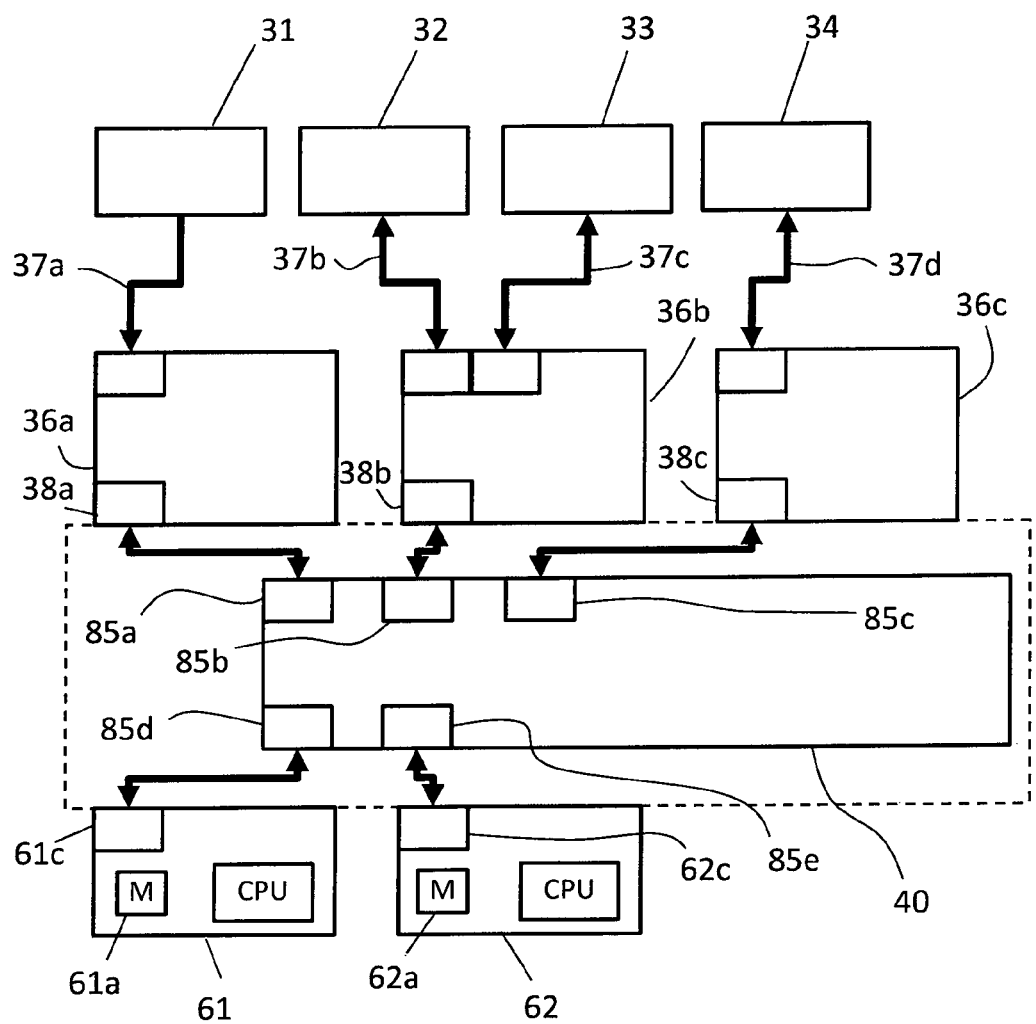
FIG. 4 a schematic representation of an execution example for distributing sensor data.

In FIG. 4, a further schematic representation of a system for distributing sensor data according to the invention is represented. The system comprises several sensors 31, 32, 33, 34. The sensors 31, 34 respectively are connected to a sensor interface of a coupling unit 36*a*, 36*c* via a signal line 37*a*, 37*d*. The sensor 31 sends sensor data to the coupling unit 36*a* via the signal line 37*a*, the sensor 34 sends sensor data to the coupling unit 36*c* via the signal line 37*d*.

The sensors 32, 33 respectively are connected to a sensor interface of a common coupling unit 36*b* via a signal line a 37*b*, 37*c*. The sensor 32 as well as the sensor 33 send sensor data to the coupling unit 36*b*. The coupling unit 36*b* has several sensor interfaces, two in this execution example.

The coupling units 36*a*, 36*b*, 36*c* have respectively a communication interface 38*a*, 38*b*, 38*c*. Via respectively the communication interfaces 38*a*, 38*b*, 38*c*, the coupling units 36*a*, 36*b*, 36*c* establish a connection to a data communication network (dashed box). In particular, the coupling unit 36*a* is connected via the communication interface 38*a* to a data interface 85*a*, the coupling unit 36*b* via the communication interface 38*b* to a data interface 85*b* and the coupling unit 36*c* via the communication interface 38*c* to a data interface 85*c* of a distributing device 85.

The coupling units 36*a*, 36*b*, 36*c* analyze received sensor data and format the sensor data in a format according to its communication interface 38*a*, 38*b*, 38*c*, in particular according to the data communication network, for example PCIe. In other words, the coupling units 36*a*, 36*b*, 36*c* create formatted sensor data packets from the sensor data according to a stipulated protocol. Further, the coupling units 36*a*, 36*b*, 36*c* can be designed to subject the received sensor data to a preprocessing before they are delivered to the local bus system as a sensor data packet. For example, the coupling units 36*a*, 36*b*, 36*c* can apply a filter algorithm to the sensor data, e.g. Gauss filter, Sobel filter, rank order filter, like erosion filter or median filter, to perform a preprocessing of the sensor data, to enrich the sensor data or to employ merely certain partial information items of the sensor data for the sensor data packet.

Analogously to the exemplary representations from FIGS. 1 to 3*b*, the distributing device 85 serves for distributing sensor packages. The distributing device 85 establishes a target address from the received sensor data packets. From the address space defined by the data communication network and indirectly by the optionally present control unit as well as an allocation table of target address to data interface 85*a-e*, the distributing device 85 establishes whether the target address describes a "normal" target address or describes a multiple-distribution target address. If the target address is a "normal" target address, the distributing device 85 establishes the data interface 85*a-e* appurtenant to the target address. If the target address relates to a multiple-distribution target address, the distributing device 85 analyzes the "normal" target addresses affected by the multiple distribution target address, data interfaces 85*a-e* and/or components in the local bus system as well as their quantity. The distributing device 85 copies the relevant sensor data packet corresponding to the established number and delivers the copied sensor data packets to the corresponding "normal" target address or the appurtenant data interfaces 85*a-e*.

The coupling unit 36*b* has two sensor interfaces and is correspondingly connected to two sensors 32, 33. The coupling unit 36*b* receives sensor data from the sensors 32, 33 via its sensor interfaces. Analogously to the coupling unit 36*a*, the coupling unit 36*b* creates respectively from the sensor data of the sensors 32, 33 sensor data packets and outputs these via the communication interface 38*b*. The sensor data of the sensors 32, 33 are processed separately from each other by the coupling unit 36*b* and a target address is allocated to each of the correspondingly created sensor data packets.

Further, the distributing device 85 is connected via the data interfaces 85*d* and 85*e* to the processing units 61, 62 via the bus interface 61*c* or bus interface 62*c*. The distributing device 85 sends a sensor data packet relayed to a data interfaces 85*d*, 85*e* to at least one processing unit 61, 62. The sensor data packet has a target address which corresponds to a physical memory address of the memory 61*a*, 62*a* of the processing unit 61, 62, thereby directly depositing the sensor data packet received by the bus interface 61*c* or 62*c* to the relevant memory address.

In principle, the present diagram for distributing sensor data can be employed not only for sensor data. Rather, distributing data of any origin via the data communication network is conceivable. As can be found in FIG. 4, at least one of the processing units 61, 62 could be designed to send data or results, for example by the processing of sensor data, to a further processing unit 61, 62. Correspondingly, the data flow can be effected in both directions, namely from and to the coupling unit 36*a*, 36*b*, 36*c* and/or from and to the processing unit 61, 62 in the bus system. Furthermore, a communication would be conceivable of a coupling unit 36*a*, 36*b*, 36 with a sensor 31, 32, 33, 34 (shown by way of example between the coupling units 36*b*, 36*c* to the sensors 32, 33, 34), for example for its later calibration.

As already shown in FIG. 2, a control unit can be provided. The control unit serves for configuring and controlling the components of the system. In particular, the communication interfaces 38*a*, 38*b*, 38*c* of the coupling units 36*a*, 36*b*, 36*c* can be influenced in the issuing of target addresses. The control unit and a processing unit 61, 62 can be also designed unified in a processing unit 61, 62 so that, for example, the processing unit 61 adopts the objects and functions of the control unit.

The coupling units 36*a*, 36*b*, 36*c* as well as the processing units 61, 62 can additionally be connected with each other via a communication system separate from the data communication network, for example Ethernet or CAN-Bus.

Figure 5:
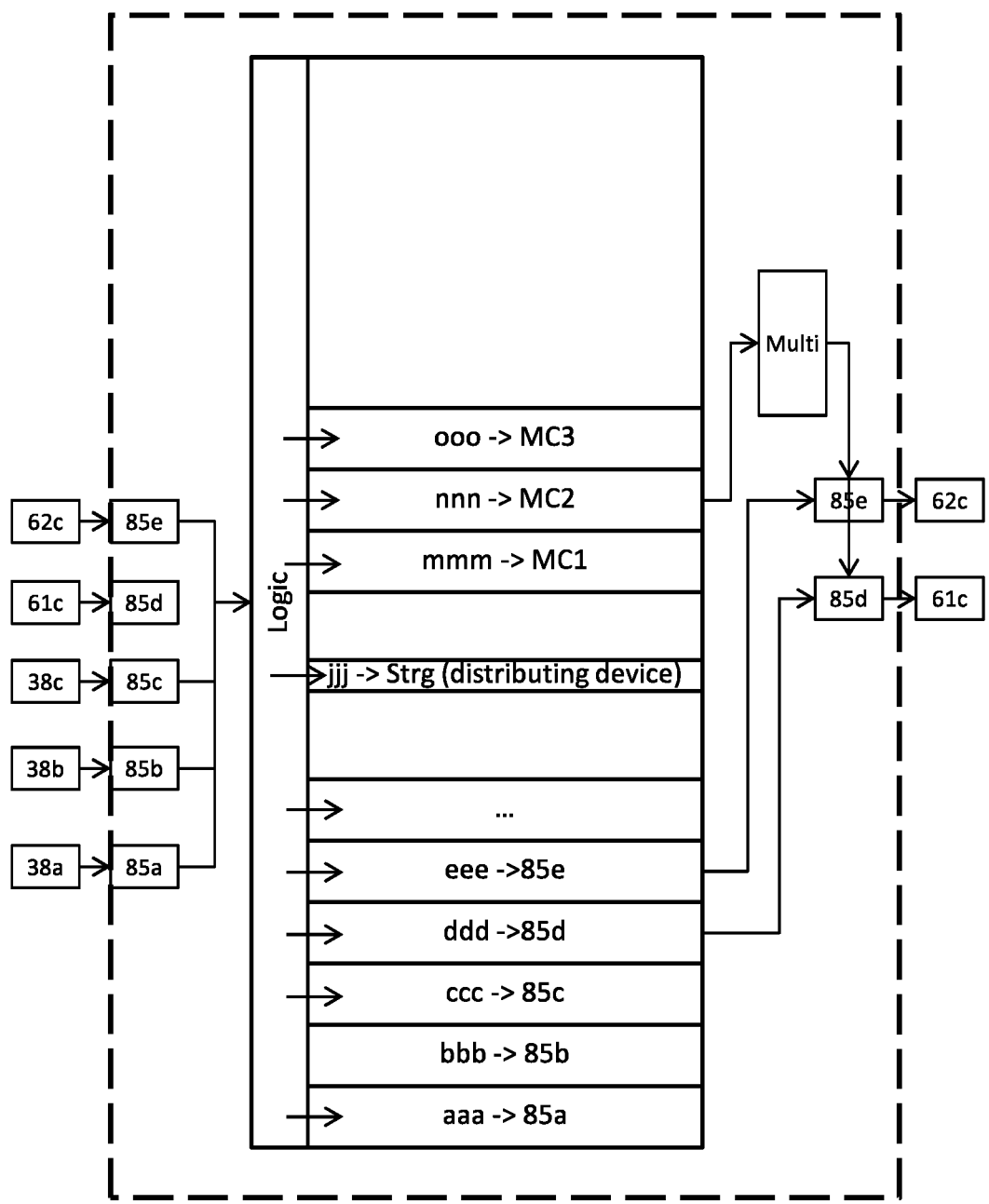
FIG. 5 by way of example and schematically an addressing range.

FIG. 5 shows schematically and by way of example an address space of the bus system from FIG. 4 with an association of data interfaces of the distributing unit 85 and target addresses with regard to the distribution of (sensor) data packets with the help of an allocation table.

For distributing sensor data, target addresses are determined by the coupling units 36*a*, 36*b*, 36*c* upon creation of sensor data packets. For example, a sensor data packet of the communication interface 38*a* of the coupling unit 36*a* has "ddd" as a target address. According to the address association, ddd concerns a memory address of the processing unit 61. Correspondingly, the distributing device 85 establishes via a logic that the sensor data packet having the target address ddd has to be relayed to the data interface 85*d*. Via the data interface 85*d*, the corresponding sensor data packet is deposited in the memory 61*c* of the processing unit 61.

Furthermore, as an example, a sensor data packet having the target address "eee" is relayed to the data interface 85*e*, thereby depositing the sensor data packet in the memory 62*c* of the processing unit 62. If the distributing device 85 receives a sensor data packet having the target address nnn, the distributing device recognizes that it is a multiple-distribution address MC 2. According to the relaying parameters established by the distributing device from the target address, the distributing device knows that this sensor data packet is to be outputted to two data interfaces 85*d* and 85*e*. Correspondingly, the sensor data packet having the factor two is multiplied (Multi) and outputted to the data interfaces 85*d* and data interfaces 85*e*. The sensor data packets are sent to the processing units 61, 62 by the data interfaces 85*d* and 85*e*. The sensor data packets having the target addresses nnn are deposited in a corresponding memory address of the processing units 61, 62.

Analogously to the distribution of sensor data described above, arbitrary data packets can be mutually exchanged on the data communication network between at least one coupling unit 36*a*, 36*b*, 36*c* and at least one processing unit 61, 62.

Figure 6:
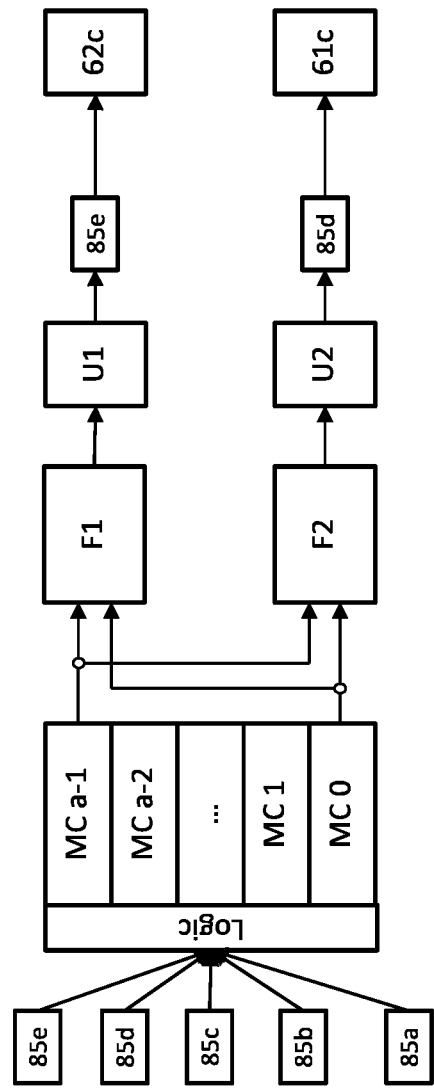
FIG. 6 a schematic representation as to the multiple-distribution functionality.

FIG. 6 schematically shows the multiple distribution of data according to a further example.

The incoming data packets at the data interfaces 85*a-e* of the distributing device are examined as to whether they fall into one of the configured multiple-distribution addressing range MC 0, MC 1, MC a−2, MC a−1. If this is the case, they are treated according to the multiple-distribution functionality. For example, a distributing device can offer up to 64 equally large addressing ranges as multiple distribution addresses: a=1 . . . 64.

If a data packet at a data interface 85*a-e* falls into the multiple-distribution address space, the appurtenant addressing range is established from the target address first (0, 1, . . . , a−1). For each data interface 85*a-e*, there exists a filter vector F1, F2 which specifies which of the addressing ranges should be relayed via the data interfaces 85*d*, 85*e* (duplication of transmittal data). In the vector, 0 . . . a bits can be set. If in no filter vector F1, F2 a bit is set for an addressing range, then the appurtenant data packets are discarded. Moreover, the distributing device ensures that a data packet is not sent back to the data interface 85*a-e* which has received the data packet, indeed not even if the corresponding bit is set in the filter vector of this data interface.

Additionally, in one execution form the multiple-distribution target addresses can be converted specifically for each data interface 85*a-e* to a new (target) addressing range by an address transponder U1, U2. One can thus drop multiple-distribution data packets in the same addressing ranges like "normal" data (normal data packets) having simple distribution target addresses. Each of the for example 64 addressing ranges of the multiple-distribution address space represents a logical channel of the data communication network. The converted addresses then have to fall into the region of the normal target addresses so that they are relayed via the data interface.

The coupling units (see for example FIG. 2) can place data simultaneously in arbitrary multiple-distribution addressing ranges MC 0, MC 1, MC a−2, MC a−1 and several coupling units can feed data simultaneously to the same multiple-distribution addressing range. In the filter vectors F1, F2 of the coupling units, no bit is set because they produce only data.

The invention claimed is:

1. A method for distributing a data stream in a value-document processing apparatus from at least one sensor to at least one processing unit, wherein the value-document processing apparatus comprises a distributing device and at least one processing unit and the distributing device has at least two data interfaces, comprising the following steps:
   (a) creating a sensor data packet comprising sensor data and a target address, wherein the target address describes a physical memory address of one of the at least one processing unit;
   (b) sending the sensor data packet to one of the data interfaces of the distributing device;
   (c) receiving the sensor data packet at the one data interface of the distributing device;
   (d) relaying the sensor data packet by the distributing device to the at least one processing unit, wherein the distributing device:
      (i) establishes relaying parameters according to the target address, and
      (ii) selects a further data interface for outputting the sensor data packet to the at least one processing unit in dependence on the target address of the sensor data packet and on relaying parameters;
   (e) receiving the sensor data packet by the at least one processing unit; and
   (f) depositing the sensor data in the memory address given by the target address of the at least one processing unit;
   wherein the distributing device is connected by means of at least two data interfaces to at least two processing units, wherein the distributing device passes on the received sensor data packet to two data interfaces, wherein the distributing device copies the sensor data packet according to a number of the data interfaces.

2. The method according to claim 1, wherein the sensor data packets are transported according to the Peripheral Component Interconncect Express (PCIe) standard or the Rapid-IO standard.

3. The method according to claim 1, wherein the at least one coupling unit is supplied, the at least one coupling unit receives sensor data and creates the sensor data packet for sending to the distributing device; wherein at least one coupling unit determines the target address for the sensor data packet and allocates it to the sensor data packet.

4. The method according to claim 1, wherein the distributing device establishes the relaying parameters by means of a relaying table.

5. The method according to claim 1, wherein at least one of the at least one processing units is designed for sending processing results to the distributing device as a processing-result package, wherein the processing-result package comprises a target address and the distributing device outputs the processing-result package to a data interface corresponding to the target address.

6. The method according to claim 1, wherein a control unit configures the sensor, the distributing device and/or the at least one processing unit.

7. The method according to claim 6, wherein the control unit stipulates the target address for sending data from the at least one processing unit, wherein the control unit sends the target address to be employed via the distributing device.

8. The method according to claim 6, wherein for each bank note the control unit stipulates to the coupling unit and/or to the processing unit a certain target address for sending data, according to an order, of an N-th bank note and/or position.

9. The method according to claim 6, wherein the control unit sends relaying parameters to the distributing device, therefore specifying relaying parameters for the distributing device and allocating a data interface of the distributing device to the target address.

10. A system for distributing sensor data in a value-document processing apparatus, comprising:
    a distributing device having at least two data interfaces, wherein the distributing device is designed to receive a sensor data packet, to establish relaying parameter to the sensor data packet in dependence on a target address contained in the sensor data packet, and to output the sensor data packet to a data interface in dependence on the target address and relaying parameters; and
    a processing unit, wherein the processing unit comprises a computing unit and a memory, the memory has a physical memory address which is described by the target address, and the processing unit is connected to the data interface to which the sensor data packet is outputted;
    wherein the distributing device is connected by means of at least two data interfaces to at least two processing units, wherein the distributing device passes on the received sensor data packet to two data interfaces, wherein the distributing device copies the sensor data packet according to a number of the data interfaces.

11. The system according to claim 10, further comprising a coupling unit, wherein the coupling unit is designed for creating the sensor data packet and is connected to the distributing device, wherein the coupling unit formats sensor data to a sensor data packet according to a stipulated protocol and assigns the target address to the sensor data packet.

12. The system according to claim 11, wherein the coupling unit is connected to at least one sensor.

13. The system according to claim 10, wherein the distributing device has a relaying table having relaying parameters.

14. The system according to claim 10, further comprising a control unit, wherein the control unit is designed to configure the distributing device and/or the processing unit, to set the target address of data packets to be sent, according to an order, and/or the relaying parameters for the distributing device.

15. The system according to claim 14, wherein the control unit is designed as a part of and/or in combination with one of the at least one processing units.

16. The system according to claim 10, wherein the system is designed to transport the sensor data packet according to the Peripheral Component Interconncect Express (PCIe) standard or Rapid-IO standard, for which the distributing device is designed as a PCIe switch or Rapid-IO switch and the coupling unit and the processing unit have corresponding PCIe or Rapid-IO interfaces.

17. The system according to claim 10, wherein each target address is assigned to at least one data interface of the distributing device.

18. The system according to claim 10, wherein the at least one coupling unit comprises a communication interface according to the Camera Link (CL) standard, the High-Level Data Link Control (HDLC) standard and/or the Common Detector Interface (CDI) specification for connecting to a sensor.

19. The system according to claim 10, wherein the coupling unit has a Field Programmable Grid Array (FPGA) and the FPGA is set up for formatting the sensor data packet.

20. The system according to claim 10, wherein at least one of the at least one coupling units has two sensor interfaces for respectively connecting to a sensor, wherein the coupling unit is designed to receive sensor data via each of the communication interfaces and to create sensor data packets respectively from the sensor data, wherein a target address is allocated to each sensor data packet and each sensor data packet is sent via a communication interface to the distributing device.

* * * * *